United States Patent [19]
Hashimoto

[11] Patent Number: 5,810,416
[45] Date of Patent: Sep. 22, 1998

[54] REAR SEAT APPARATUS FOR A VEHICLE

[75] Inventor: Kazunori Hashimoto, Toyota, Japan

[73] Assignee: Toyota Jidosha Kabushiki Kaisha, Toyota, Japan

[21] Appl. No.: 691,146

[22] Filed: Aug. 1, 1996

[30] Foreign Application Priority Data

Sep. 22, 1995 [JP] Japan ..................................... 7-244873

[51] Int. Cl.⁶ .................................................. B60N 2/02
[52] U.S. Cl. .................................. 296/65.01; 296/65.05; 297/326; 297/329; 297/452.63
[58] Field of Search ............................. 296/65.1, 66, 63; 297/325, 326, 329, 331, 452.63

[56] References Cited

U.S. PATENT DOCUMENTS

| | | | |
|---|---|---|---|
| 3,328,069 | 6/1967 | Dumas | 296/65.1 |
| 4,227,736 | 10/1980 | Labault et al. | 296/65.1 |
| 4,475,763 | 10/1984 | Hamatani et al. | |
| 4,512,609 | 4/1985 | Parsson. | |
| 4,637,653 | 1/1987 | Yoshida et al. | |
| 4,928,334 | 5/1990 | Kita | 297/452.63 X |
| 5,044,683 | 9/1991 | Parsson. | |
| 5,240,302 | 8/1993 | Yoshida et al. | |
| 5,385,389 | 1/1995 | Bishai | 297/452.63 X |
| 5,516,180 | 5/1996 | Eavenson, Sr. et al. | 296/65.1 X |

FOREIGN PATENT DOCUMENTS

| | | |
|---|---|---|
| 3-189245 | 8/1991 | Japan. |
| 3-125625 | 12/1991 | Japan. |
| 5-85242 | 4/1993 | Japan. |

*Primary Examiner*—Joseph D. Pape
*Attorney, Agent, or Firm*—Cushman Darby & Cushman IP Group of Pillsbury Madison & Sutro LLP

[57] ABSTRACT

A rear seat apparatus for a vehicle is disposed on a rear elevated portion of the floor of the vehicle and allows at least a rear seat cushion, which is a portion of the rear seat apparatus, to swing by approximately 90 degrees toward the front of the vehicle from a horizontal seating state to an upright state. The rear seat apparatus includes a connecting mechanism which connects the rear seat cushion to the floor so as to allow the rear seat cushion to be swung between the seating state and the upright state. In the seating state, the rear seat cushion is disposed on the floor so that a passenger can sit thereon. In the upright state, the rear surface of the rear seat cushion is allowed to abut the vertical wall surface of a stepped portion of the floor.

25 Claims, 9 Drawing Sheets

F I G. 4
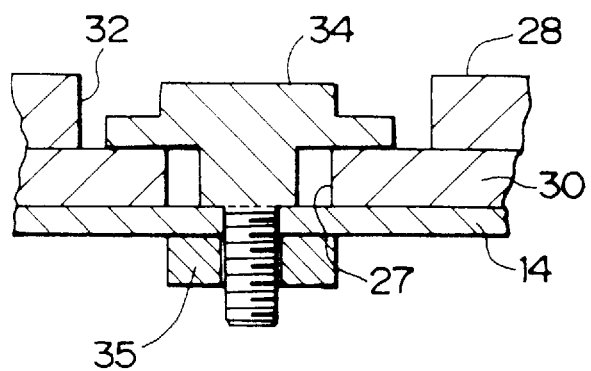

REAR SEAT APPARATUS FOR A VEHICLE

BACKGROUND OF THE INVENTION

1. Field of the Invention

The present invention relates to a rear seat apparatus for a vehicle, and particularly to a rear seat apparatus for a vehicle disposed on the elevated rear portion of a stepped floor of the vehicle.

2. Description of the Related Art

A conventional rear seat apparatus for a vehicle, which is disposed on the elevated rear portion of a vehicle floor, has a structure disclosed, for example, in Japanese Patent Application Laid-Open (JP-A) No. 3-189245.

As shown in FIG. 8, in the conventional rear seat apparatus for a vehicle, a rear seat 70 is composed of a seat cushion 72 and a seat back 74. The seat back 74 can swing toward the front of a vehicle (in the direction of arrow S1 in FIG. 8), pivoting on a first hinge 76. The seat cushion 72 is connected to a vehicle floor 80 by means of a substantially L-shaped link arm 78, thereby allowing it to swing toward the front of a vehicle (in the direction of arrow S2 in FIG. 8).

In this rear seat apparatus, when the seat cushion 72 and the seat back 74 are swung forward to respective positions shown in FIG. 9, a rear surface 74A of the seat back 74 serves as an article supporting surface on which an article 82 is placed.

However, in this rear seat apparatus, when the vehicle receives an impact from its front end in the state in which the seat cushion 72 stands upright with the article 82 being placed on the rear surface 74A of the seat back 74 as shown in FIG. 9, the article 82 will move forward (in the direction of arrow Y in FIG. 9) and hit against the seat cushion 72. When the article is already in contact with the seat cushion 72 (as represented by a two dots-and-dash line in FIG. 9), an inertial force of the article 82 acts on the seat cushion 72. Accordingly, in order to reliably prevent the seat cushion 72 from moving forward due to a thrust of the article 82, it is necessary to sufficiently reinforce the link arm 78 supporting the seat cushion 72, a support portion for the link arm 78, a front seat 84, and the like, resulting in a significant increase in weight.

SUMMARY OF THE INVENTION

In view of the foregoing fact, it is an object of the present invention to provide a rear seat apparatus for a vehicle which can reliably prevent a rear seat cushion from moving forward due to a thrust of an article carried behind the rear seat cushion, without causing a significant increase in weight.

According to a first aspect of the present invention, there is provided a rear seat apparatus for a vehicle disposed on a rear elevated portion of the floor of the vehicle and allowing at least a rear seat cushion, which is a portion of the rear seat apparatus, to swing by approximately 90 degrees toward the front of the vehicle from a horizontal seating state to an upright state. This rear seat apparatus includes a connecting mechanism which connects the rear seat cushion to the floor so as to allow the rear seat cushion to be moved between its seating state and its upright state. In the seating state, the rear seat cushion is disposed on the floor so that a passenger can sit thereon. In the upright state, the rear surface of the rear seat cushion is allowed to abut the vertical wall surface of a stepped portion of the floor.

According to the first aspect, with the rear seat cushion being in its upright state, when the vehicle receives an impact from its front end, an article carried behind the rear seat cushion imposes a load on the upper rear surface of the rear seat cushion. As a result, the lower portion of the upright rear seat cushion attempts to swing backward. However, since the rear surface of the rear seat cushion is in contact with the vertical wall surface of the stepped portion of the floor, the load acting on the rear seat cushion is received by the vertical wall surface.

Further, the upright rear seat cushion slides downward, leaving almost no clearance between the upright rear seat cushion and the vertical wall surface of the stepped portion of the floor.

According to a second aspect of the present invention, in the rear seat apparatus for a vehicle according to the first aspect, the connecting mechanism is a rotary slide mechanism disposed at the floor and the rear seat cushion. The rotary slide mechanism allows the rear seat cushion to swing by approximately 90 degrees from the seating state toward the front of the vehicle and then to slide downward.

According to the second aspect, due to existence of the rotary slide mechanism, the rear seat cushion can be swung by approximately 90 degrees toward the front of the vehicle and then be slid downward to enter its upright state.

According to a third aspect of the present invention, in the rear seat apparatus for a vehicle according to the second aspect, the rotary slide mechanism has a rear seat cushion guide portion for guiding the rear seat cushion for movement in the longitudinal direction of the vehicle.

According to a fourth aspect of the present invention, in the rear seat apparatus for a vehicle according to the second aspect, the rotary slide mechanism has a hinge member which is composed of a lower plate, an upper plate, and a connection member for pivotably connecting the lower plate and the upper plate. The lower plate is mounted on the floor so as to be able to slide over a predetermined range in the longitudinal direction of the vehicle. The upper plate is mounted to the rear seat cushion.

According to the third and fourth aspects, with the cushion seat being in its seating state, by sliding backward over a predetermined range the lower plate of the rotary slide mechanism, the rotary slide mechanism will not interfere with a leg of a passenger.

According to a fifth aspect of the present invention, in the rear seat apparatus for a vehicle according to the first or second aspect, a frame is provided inside the rear seat cushion along the peripheral edge portion thereof which projects upward from the floor when the rear seat cushion is in the upright state. Further, a webbing is provided across the frame in the widthwise direction of the vehicle.

According to the fifth aspect, when an article carried behind the upright rear seat cushion moves forward due to the vehicle receiving an impact from its front end, the webbing receives the article to transmit its load to the seat frame.

According to the first aspect, in the rear seat apparatus for a vehicle disposed on a rear elevated portion of the floor of the vehicle and allowing at least a rear seat cushion, which is a portion of the rear seat apparatus, to swing by approximately 90 degrees toward the front of the vehicle to its upright, the connecting mechanism connects the rear seat cushion to the floor so as to allow the rear seat cushion to be moved between its seating state and its upright state. In the upright state, the rear surface of the rear seat cushion can abut the vertical wall surface of the stepped portion of the floor. This reliably prevents the upright rear seat cushion from moving forward due to a thrust of an article carried behind the upright rear seat cushion. Further, the upright rear seat cushion can be slid downward, providing more space thereabove. This facilitates loading/unloading an article over the upright rear seat cushion from the front seat side. In addition, since no clearance is formed between the upright cushion and the vertical wall surface of the stepped portion of the floor, an excellent effect is provided such that no article will drop in the otherwise formed clearance, and no dead space is formed.

According to the second aspect, in the rear seat apparatus for a vehicle according to the first aspect, the connecting mechanism is the rotary slide mechanism disposed on the floor and mounted to the rear seat cushion. The rotary slide mechanism allows the rear seat cushion to swing forward by approximately 90 degrees and then to slide downward. This provides the effects of the first aspect through a simple structure, and makes it possible to handle the rear seat cushion more easily.

According to the third and fourth aspects, in the rear seat apparatus for a vehicle according to the second aspect, the rotary slide mechanism is composed of the rear seat cushion guide portion and the upper plate, both of which are mounted to the rear seat cushion; the lower plate mounted on the floor; and the connection member for pivotably connecting the lower plate and the upper plate. In addition, the lower plate is mounted on the floor such that it can slide over a predetermined range in the longitudinal direction of the vehicle. Thus, in addition to the effects of the second aspect, this provides an excellent effect that the rotary slide mechanism does not interfere with a leg of a passenger.

According to the fifth aspect, in the rear seat apparatus for a vehicle according to the first or second aspect, the frame is provided inside the rear seat cushion along the peripheral edge portion of the rear seat cushion which projects upward from the floor when the rear seat cushion is in its upright state. Further, the webbing is provided across the frame in the widthwise direction of the vehicle. In addition to the effects of the first or second aspect, this provides an excellent effect that a load imposed by an article carried behind the upright rear seat cushion can be reliably transmitted to the seat frame.

BRIEF DESCRIPTION OF THE DRAWINGS

FIG. 4 is an enlarged cross-section taken along line 4—4 in FIG. 3;

DESCRIPTION OF THE PREFERRED EMBODIMENT

An embodiment of a rear seat apparatus for a vehicle of the present invention will now be described with reference to FIGS. 1 to 6.

In these drawings, arrow FR indicates the forward direction of the vehicle, and arrow UP indicates the upward direction of the vehicle.

Figure 1:
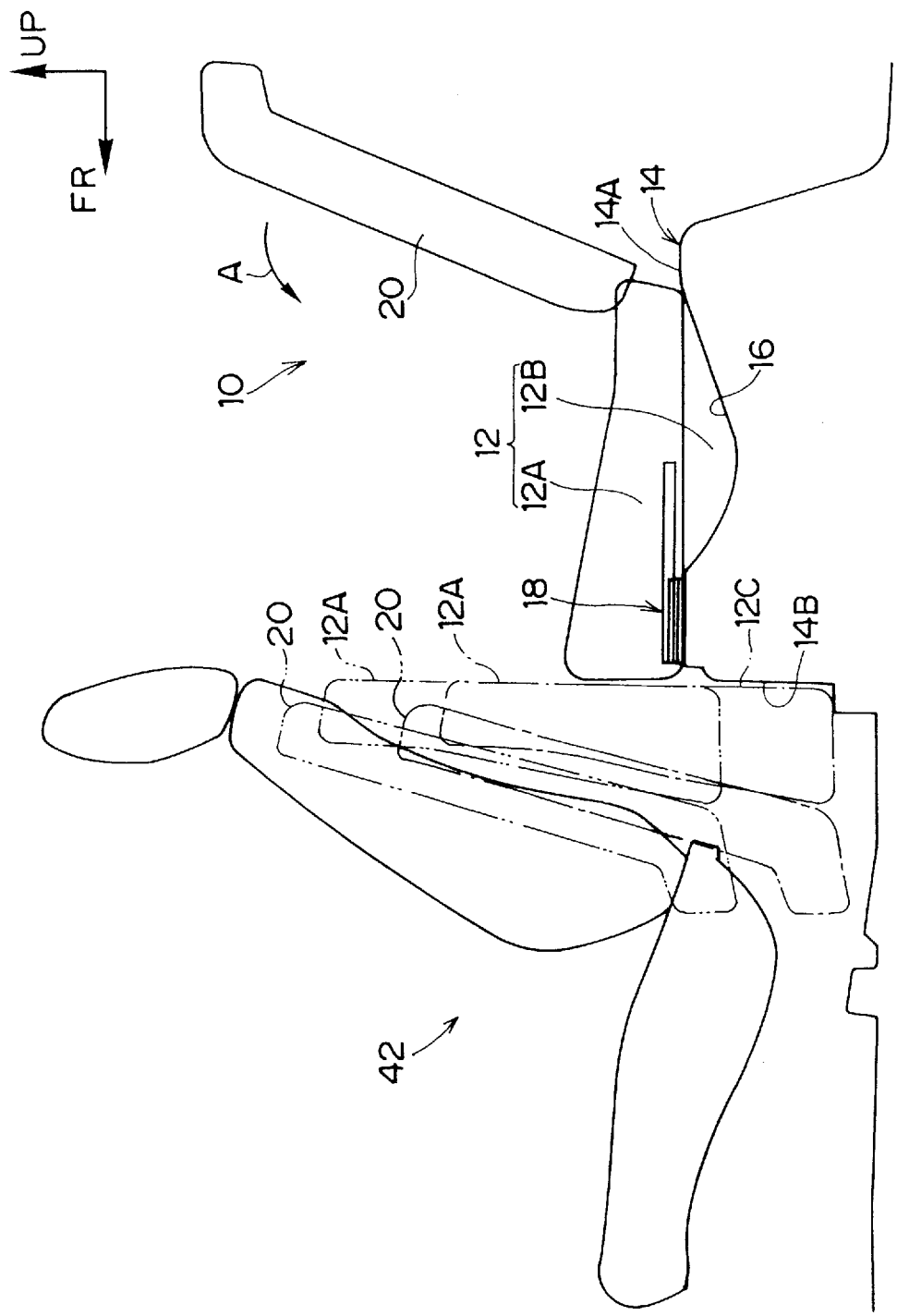
FIG. 1 is a schematic side view showing a rear seat apparatus for a vehicle according to a first embodiment of the present invention.

As shown in FIG. 1, a rear seat cushion 12 of a rear seat 10 of the present embodiment is disposed on an elevated rear floor surface 14A of a floor, which has a stepped portion between its front portion and the elevated rear floor surface 14A. The rear seat cushion 12 is divided into a rear seat cushion main body portion 12A located above the floor surface 14A and a rear seat cushion divisional portion 12B located below the floor surface 14A.

The rear seat cushion main body portion 12A is mounted on the front end portion of the floor surface 14A via a rotary slide mechanism 18 serving as a connecting mechanism. The rotary slide mechanism 18 allows the rear seat cushion main body portion 12A to swing by approximately 90 degrees toward the front of the vehicle as illustrated by the two dots-and-dash line in FIG. 1. In this case, the rear seat cushion divisional portion 12B remains in a depression 16 formed in the floor surface 14A.

A rear seat back 20 is mounted via an unillustrated hinge portion to the rear portion of the rear seat cushion main body portion 12A such that it can swing forward (in the direction of arrow A in FIG. 1).

Accordingly, when with the rear seat back 20 folded toward the front of the vehicle (i.e. folded onto the rear seat cushion main body portion 12A), the rear seat cushion main body portion 12A is raised upright, the rear seat cushion divisional portion 12B remains in the depression 16 formed in the floor surface 14A, thereby providing a flat surface for carrying an article thereon. In addition, since the rear surface of the rear seat cushion main body portion 12A in its upright state is flat, a relatively large space is provided for housing an article therein.

The rotary slide mechanism 18 attached to the bottom surface of the rear seat cushion main body portion 12A allows the rear seat cushion main body portion 12A and the rear seat back 20 in their upright state to slide further downward from the position illustrated in the two dots-and-dash line to the position illustrated in the dot-and-dash line. When the rear seat cushion main body portion 12A is in its upright state illustrated in the dot-and-dash line, there is almost no clearance formed between a vertical wall surface 14B of the floor 14 and a bottom surface 12C of the rear seat cushion main body portion 12A.

Figure 2:
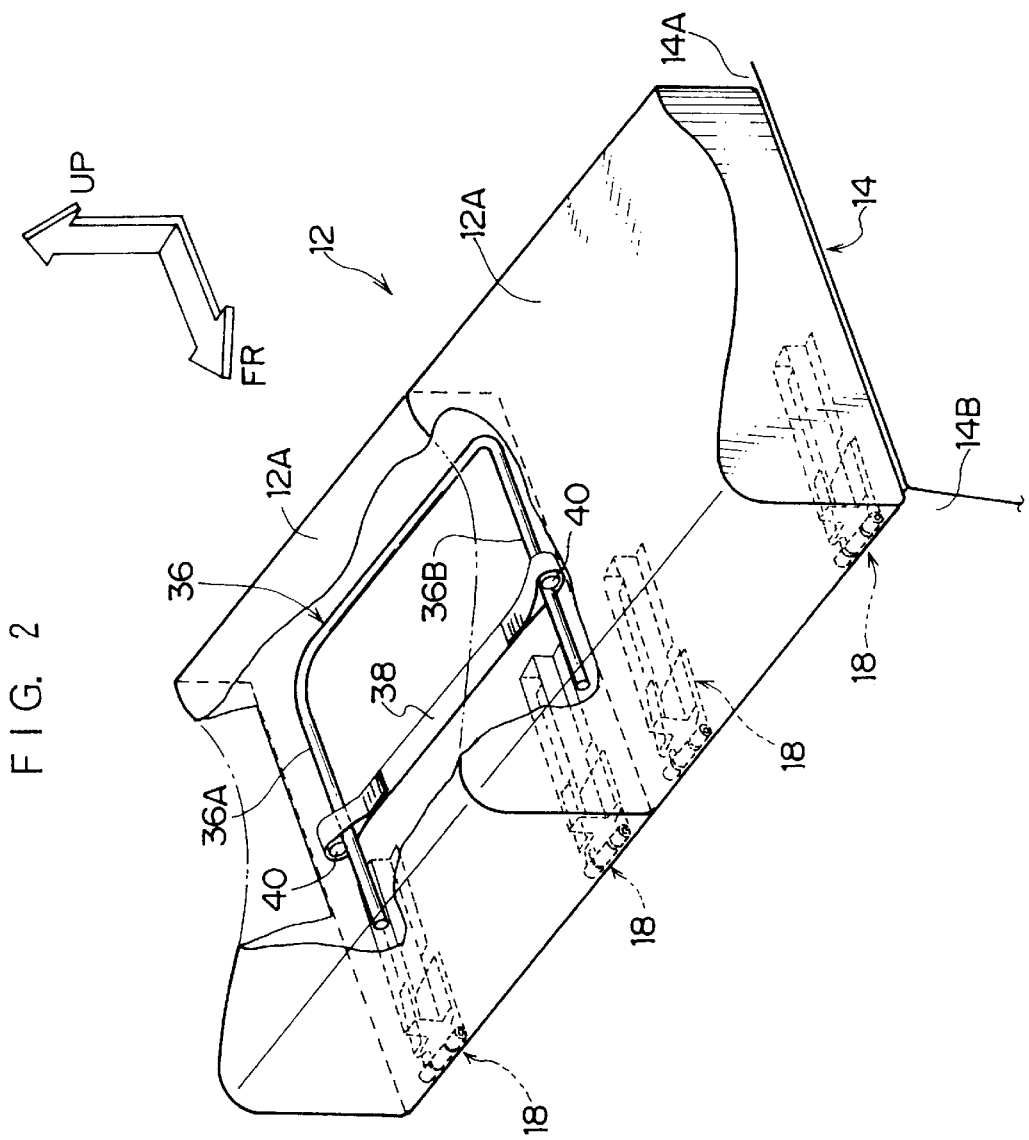
FIG. 2 is a perspective and partially broken view showing a rear seat cushion of the rear seat apparatus according to the first embodiment as viewed from the front of the vehicle and at a diagonal.

As shown in FIG. 2, the rotary slide mechanism 18 extending in the front-rear direction of the vehicle is disposed at the front portion of the bottom surface of each of the right and left rear seat cushion bodies 12A such that it is located off a normal seating zone, for example, in the vicinity of the right and left ends of each rear seat cushion main body portion 12A.

Figure 3:
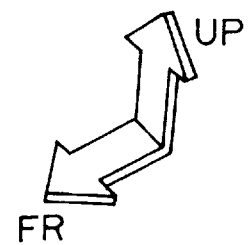
FIG. 3 is a perspective view showing a rotary slide mechanism of the rear seat apparatus according to the first embodiment as viewed from the front of the vehicle and at a diagonal.
Figure 3:
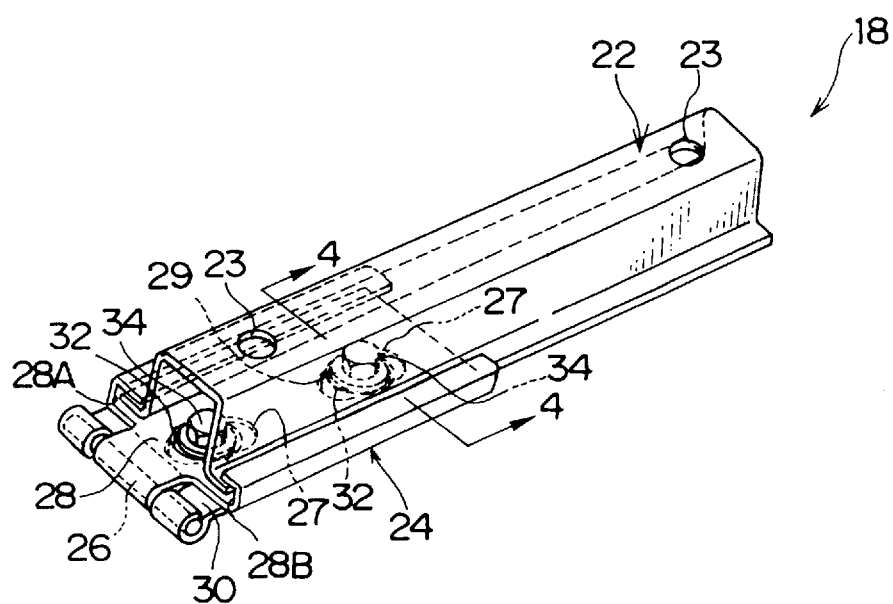

As shown in FIG. 3, the rotary slide mechanism 18 is composed of a rail 22, which is mounted to the bottom portion of the rear seat cushion main body portion 12A, and a hinge portion 24, which is mounted onto the floor 14.

The rail 22 has a pair of front and rear mounting holes 23 formed therein. The rail 22 extending in the front-rear direction of the vehicle is fixed to the bottom portion of the rear seat cushion main body portion 12A using unillustrated bolts inserted into the mounting holes 23. The hinge portion 24 is composed of a pin 26, an upper plate 28, and a lower plate 30. The axis of the pin 26 is located in the same surface as the floor surface 14A and extends in the widthwise direction of the vehicle. The rail 22 is slidably engaged with the upper plate 28. The front end portion of the upper plate 28 and that of the lower plate 30 are connected together by means of the pin 26, thereby allowing the upper plate 28 to swing about the pin 26.

As shown in FIGS. 3 and 4, in the lower plate 30 is formed a pair of front and rear elongated holes 27 elongated in the front-rear direction of the vehicle. Through-holes 32 are formed in the upper plate 28 at the positions corresponding to the elongated holes 27.

As shown in FIG. 4, a stepped bolt 34 is inserted into the through-hole 32 and the elongated hole 27. By engaging a nut 35 with the stepped bolt 34, the lower plate 30 is mounted onto the floor 14 such that it can slide in the front-rear direction of the vehicle over a predetermined range along the elongated holes 27.

In the normal seating state, the rear seat cushion main body portion 12A is locked onto the floor 14 at the rear portion thereof (not shown). A plurality of locks of this kind are provided so that the rotary slide mechanism 18 provides a seat slide function when the rear seat cushion main body portion 12A is in its seating state. Accordingly, a depression 15 is formed at the upper end portion of the vertical wall surface 14B, as shown in the two dots-and-dash line in FIG. 5.

Figure 5:
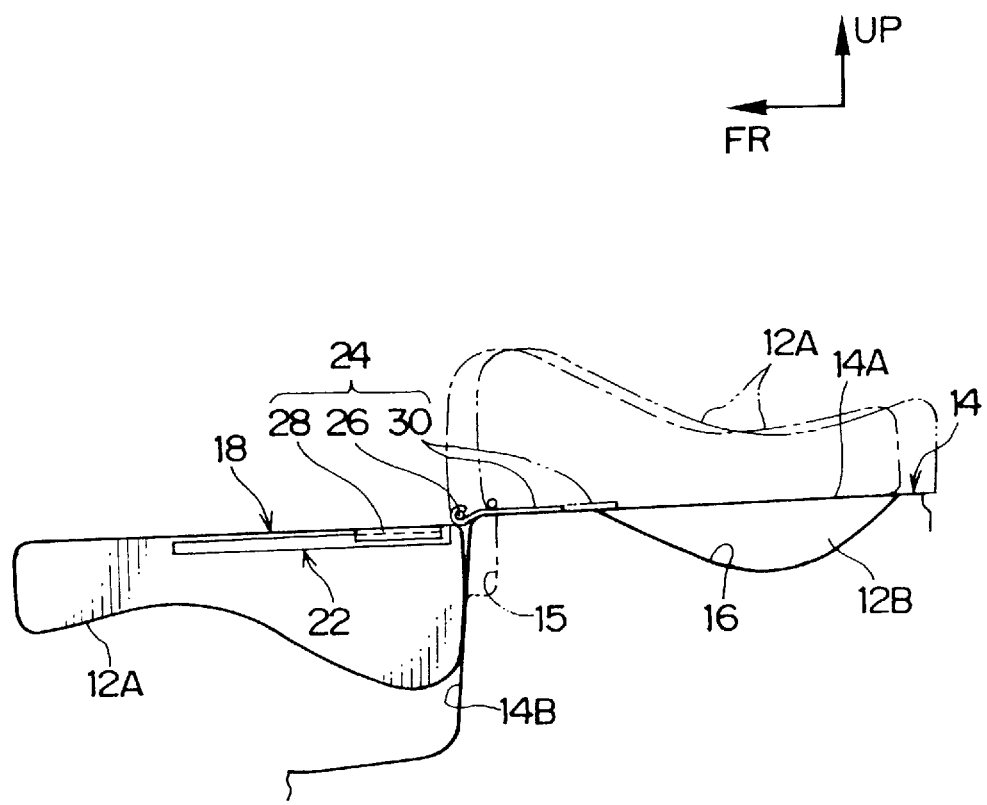
FIG. 5 is a view illustrating the overturned rear seat cushion of the rear seat apparatus according to the first embodiment.
Figure 6:
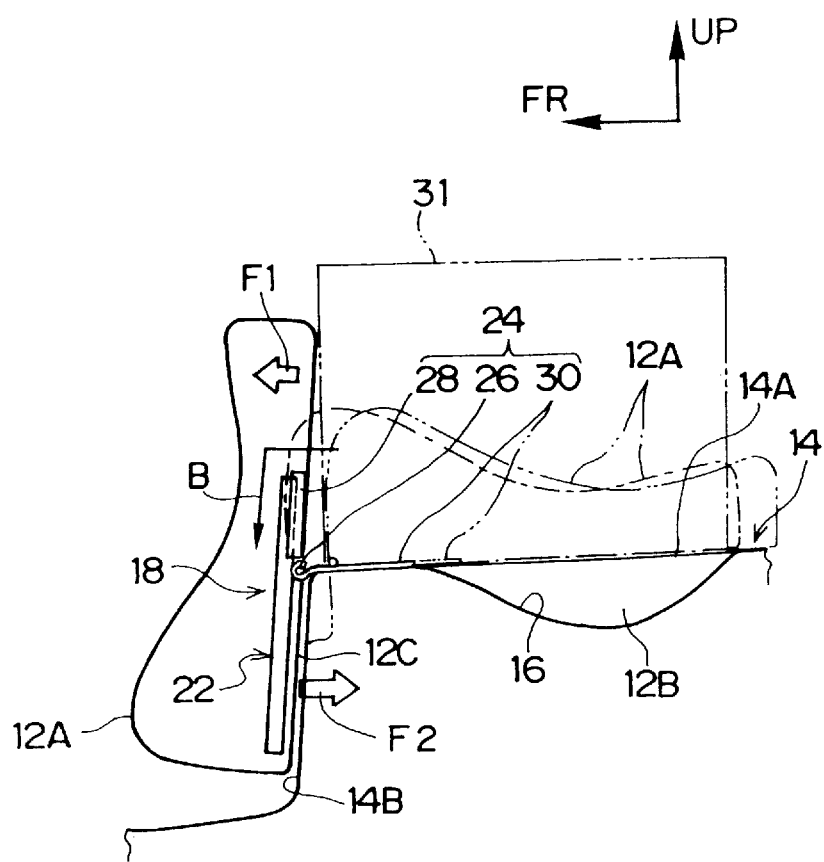
FIG. 6 is a view for explaining the operation for swinging the rear seat cushion of the rear seat apparatus to its upright state.

When the rear seat cushion main body portion 12A is in its seating state as illustrated by the two dots-and-dash line in FIG. 5, it is retracted from the vertical wall surface 14B toward the rear side of the vehicle. As shown in FIG. 5, the rear seat cushion main body portion 12A, together with the lower plate 30, can slide toward the front of the vehicle along the elongated holes 27 from the position illustrated in the two dots-and-dash line to the position illustrated in the dot-and-dash line. Then, the rear seat cushion main body portion 12A can be swung about the pin 26 of the hinge portion 24 from the position illustrated in the dot-and-dash line to the position illustrated in the solid line. As shown in FIG. 6, when the rear seat cushion main body portion 12A is raised up by approximately 90 degrees, the rail 22 fixed to the rear seat cushion main body portion 12A can slide along a pair of right and left channels 28A and 28B (FIG. 3) provided on the upper plate 28. Thus, the rear seat cushion main body portion 12A can slide down in the direction of arrow B in FIG. 6 to enter the state illustrated in the solid line (upright state).

In the present embodiment, as shown in FIG. 2, a frame 36 formed by bending a pipe into a U-like shape is provided along the bottom peripheral portion of the rear seat cushion main body portion 12A. The frame 36 is raised together with the rear seat cushion main body portion 12A. Further, a webbing 38 is provided between leg portions 36A and 36B of the frame 36 such that it extends in the widthwise direction of the vehicle. Thus, when the rear seat cushion main body portion 12A is in its upright state and an article carried behind the rear seat cushion main body portion 12A moves toward the front of the vehicle, the webbing 38 receives the article to transmit a load of the article to the frame 36.

Further, an elastic pad 40 is inserted between the webbing 38 and each of the legs 36A and 36B of the frame 36, thereby tensing the webbing 38 by its elastic force in the normal state. When a passenger sits in the rear seat cushion main body portion 12A which is in its seating state, the weight of the passenger causes the pads 40 to deform via the webbing 38, so that the webbing 38 can deflect. Thus, the cushioning effect of the rear seat cushion 12 is not hindered. When the weight of a passenger is not imposed on the rear seat cushion main body portion 12A (i.e. in the normal free state), the pads 40 are restored to make flat the bottom surface of the rear seat cushion main body portion 12A.

The rear seat cushion main body portion 12A is divided into two, i.e. right and left divisions corresponding to a driver's seat and an assistant driver's seat (for example, the ratio of the right division and the left division is 6:4). On the right side corresponding to the driver's seat, the rear seat cushion main body portion 12A and the rear seat back 20 can be swung by approximately 90 degrees toward the front of the vehicle to enter an upright state. On the left side corresponding to the assistant driver's seat, the rear seats cushion main body portion 12A and the rear seat back 20 can be swung by approximately 90 degrees toward the front of the vehicle to enter an upright state, and in addition the rear seat cushion main body portion 12A can be swung by approximately 180 degrees toward the front of the vehicle so that the rear seat cushion main body portion 12A is overturned.

Figure 7:
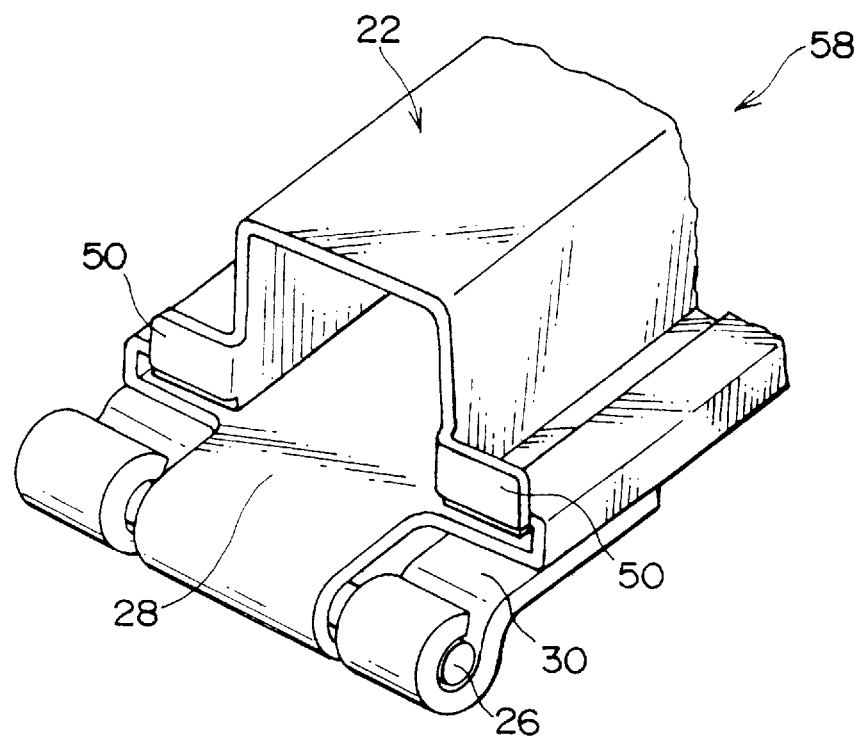
FIG. 7 is an enlarged perspective view of principal portions of another aspect of the rotary slide mechanism of the rear seat apparatus according to the first embodiment as viewed from the front of the vehicle and at a diagonal.
Figure 8:
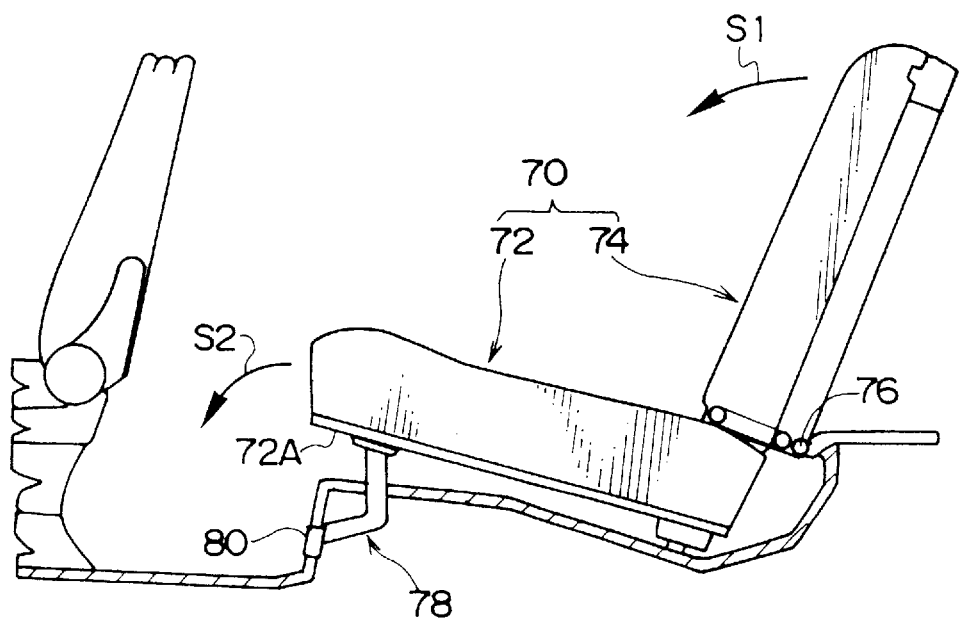
FIG. 8 is a schematic side view showing a conventional vehicle rear seat apparatus in its seating state.
Figure 9:
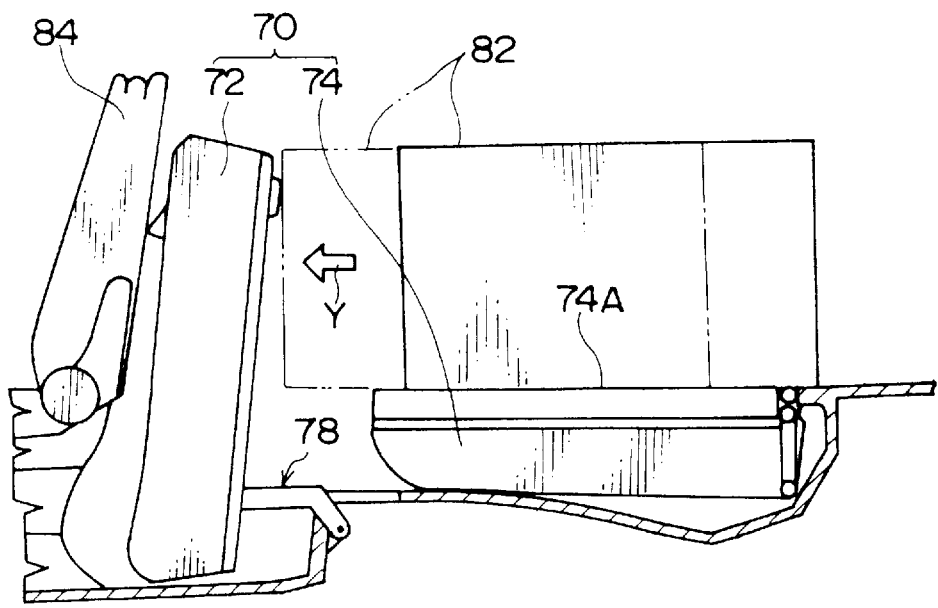
FIG. 9 is a schematic side view showing the conventional vehicle rear seat apparatus in its upright state.

The rotary slide mechanism used in the present invention is not limited to the structure illustrated in FIG. 3, and, for example, a rotary slide mechanism 58 illustrated in FIG. 7 may also be used. In the rotary slide mechanism 58, in addition to the structure of the rotary slide mechanism 18 illustrated in FIG. 3, a stopper 50 is provided integrally with the front end portion of the rail 22 in the longitudinal direction of the vehicle. The stopper 50 can abut the vehicle longitudinal direction front end portion of the upper plate 28. As illustrated in FIG. 5, when the rear seat cushion main body portion 12A moves from the dot-and-dash line position to the two dots-and-dash line position, the stopper 50 pushes the front end portion of the upper plate 28. As a result, the upper plate 28 can be moved into the depression 15 together with the lower plate 30 which is connected to the upper plate 28.

Note that the stopper 50 may be formed integrally with the rail 22 or may be formed as a separate member.

Next, the operation of the present embodiment will be described.

In the rear seat apparatus of the present embodiment, the rotary slide mechanism 18 attached to the bottom surface of the rear seat cushion main body portion 12A allows the rear seat cushion main body portion 12A with the rear seat back 20 folded thereonto to swing by approximately 90 degrees toward the front of the vehicle and then allows them to slide downward from the position illustrated by the two dots-and-dash line in FIG. 1 to the position illustrated by the dot-and-dash line in FIG. 1 (upright state). As shown in FIG. 6, when the vehicle receives an impact from its front end, an article 31 imposes a load (represented by arrow F1 in FIG. 6) on the upper rear surface of the rear seat cushion main body portion 12A. Due to this load, the rear seat cushion main body portion 12A attempts to swing about the pin 26. That is, the lower portion of the upright rear seat cushion main body portion 12A attempts to swing toward the rear of the vehicle. In this case, since the lower rear surface 12C of the upright rear seat cushion main body portion 12A interfere with the vertical wall surface 14B of the floor 14, a load acting in the lower portion of the upright rear seat cushion main body portion 12A toward the rear of the vehicle (represented by arrow F2 in FIG. 6) is received by the vertical wall surface 14B.

As a result, there is no need of providing an additional reinforcing member for supporting the rear seat cushion main body portion 12A against the above-mentioned loads. Thus, through a simple structure and without increasing a vehicle weight, it is possible to reliably prevent the rear seat cushion main body portion 12A from moving forward due to a thrust of the article 31. In addition, the rear seat cushion 12 becomes easier to handle. Also, the webbing 38 receives a thrust of the article 31 and reliably transmits the thrust to the frame 36.

In the rear seat apparatus of the present embodiment, the rear seat cushion main body portion 12A is housed upright along the vertical wall surface 14B of the floor 14 without leaving a clearance therebetween. Thus, an article can be prevented from dropping through a clearance which would otherwise be formed between the vertical wall surface 14B and the rear seat cushion main body portion 12A.

In the rear seat apparatus of the present embodiment, the rear seat cushion 12 is divided into the rear seat cushion 12A and the rear seat cushion divisional portion 12B. When the rear seat cushion main body portion 12A, together with the rear seat back 20, is raised upright, the rear seat cushion divisional portion 12B is left in the depression 16 in the floor 14. This provides a flat floor for carrying an article thereon. In addition, since the rear surface of the upright rear seat cushion main body portion 12A is flat, a relatively large space is provided for housing an article therein.

In the rear seat apparatus of the present invention, the rear seat cushion main body portion 12A, together with the rear seat back 20, can slide downward in an upright state to be housed behind a front seat 42, providing more space thereabove. This facilitates loading/unloading an article over the upright rear seat cushion main body portion 12A from the front seat 42 side.

In addition, by sliding the rotary slide mechanism 18 on the floor 14 along the elongated holes 27 (FIG. 3) toward the rear of the vehicle over a predetermined range, the seat cushion main body portion 12A can be retracted from the vertical wall surface 14B toward the rear of the vehicle (retracted to the position represented by the two dots-and-dash line in FIG. 5). Thus, the leg portion of a passenger does not interfere with the rotary slide mechanism 18. If the floor surface 14A does not project beyond the rear seat cushion main body portion 12A in the normal seating state, it is unnecessary to provide the elongated holes 27.

While the present invention has been described in detail with reference to the specific embodiment, it should be apparent to those skilled in the art that the present invention is not limited thereto. The present invention may be practiced in other ways without departing from the scope of the invention.

What is claimed is:

1. A rear seat apparatus, having a rear seat cushion, disposed on a rear elevated portion of the floor of a vehicle, the floor having a stepped portion between the rear elevated portion and a portion of the floor in front of the rear elevated portion, said rear seat apparatus allowing at least the rear seat cushion to swing by approximately 90 degrees toward the front of the vehicle from a horizontal seating state to an upright state, said rear seat apparatus comprising:

a connecting mechanism for connecting said rear seat cushion to said elevated portion of the floor so as to allow the rear seat cushion to be moved between the seating state and the upright state, said connecting mechanism permitting the rear seat cushion to rotate and slide with respect to the elevated portion of the floor, wherein in the seating state, said rear seat cushion is disposed on the elevated portion of the floor so that a passenger can sit thereon, and in the upright state, a rear surface of said rear seat cushion is allowed to abut a vertical wall surface of the stepped portion of the floor.

2. A rear seat apparatus for a vehicle according to claim 1, wherein said connecting mechanism is a rotary slide mechanism disposed at the elevated portion of the floor and said rear seat cushion, said rotary slide mechanism allowing said rear seat cushion to swing by approximately 90 degrees from the seating state toward the front of the vehicle and then to slide downward.

3. A rear seat apparatus for a vehicle according to claim 2, wherein said rotary slide mechanism has a rear seat cushion guide portion for guiding said rear seat cushion for movement in the longitudinal direction of the vehicle.

4. A rear seat apparatus for a vehicle according to claim 2, wherein said rotary slide mechanism has a hinge member which is composed of a lower plate, an upper plate, and a connection member for pivotably connecting said lower plate and said upper plate, said lower plate being mounted on the elevated portion of the floor so as to be able to slide in the longitudinal direction of the vehicle, and said upper plate being mounted to the rear seat cushion.

5. A rear seat apparatus for a vehicle according to claim 4, wherein said lower plate has a lower plate guide member which guides said hinge member for movement in the longitudinal direction of the vehicle.

6. A rear seat apparatus for a vehicle according to claim 4, wherein said upper plate is fit on a seat cushion guide portion mounted to said seat cushion.

7. A rear seat apparatus for a vehicle according to claim 1, further comprising:

a frame provided inside said rear seat cushion along the peripheral edge portion thereof which projects upward from the elevated portion of the floor when said rear seat cushion is in the upright state; and a webbing provided across said frame in the widthwise direction of the vehicle.

8. A rear seat apparatus for a vehicle according to claim 7, further comprising:

elastic members disposed between said frame and said webbing so as to prevent said webbing from slacking in its normal state.

9. A rear seat apparatus for a vehicle according to claim 2, further comprising:

a frame provided inside said rear seat cushion along the peripheral edge portion thereof which projects upward when said rear seat cushion is in the upright state; and a webbing provided across said frame in the widthwise direction of the vehicle.

10. A rear seat apparatus for a vehicle according to claim 9, further comprising:

elastic members disposed between said frame and said webbing, said elastic member being deformed when said webbing is in a normal state.

11. A rear seat apparatus, having a rear seat cushion, disposed on a rear elevated portion of the floor of a vehicle, the floor having a stepped portion between the rear elevated portion and a portion of the floor in front of the rear elevated portion, said rear seat apparatus allowing at least the rear seat cushion to swing by approximately 90 degrees toward the front of the vehicle from a horizontal seating state to an upright state, said rear seat apparatus comprising:

a rotary slide mechanism disposed at the elevated portion of the floor and said rear seat cushion and adapted to allow the rear seat cushion to be moved between the seating state and the upright state by swinging said rear seat cushion by approximately 90 degrees from the seating state toward the front of the vehicle and then sliding said rear seat cushion downward, wherein in the seating state, said rear seat cushion is positioned on the elevated portion of the floor so that a passenger can sit thereon, and in the upright state, the rear surface of said rear seat cushion is allowed to abut a vertical wall surface of the stepped portion of the floor.

12. A rear seat apparatus for a vehicle according to claim 11, wherein said rotary slide mechanism has a rail for guiding said rear seat cushion for movement in the longitudinal direction of the vehicle, and a hinge member composed of a lower plate, an upper plate, and a connection member for pivotably connecting one end of said lower plate and one end of said upper plate, said lower plate being mounted on the elevated portion of the floor such that it is allowed to slide over a predetermined range in the longitudinal direction of the vehicle, and said upper plate being mounted to the rear seat cushion.

13. A rear seat apparatus for a vehicle according to claim 12, wherein said lower plate has an elongated hole for guiding said hinge member for movement in the longitudinal direction of the vehicle.

14. A rear seat apparatus for a vehicle according to claim 12, wherein said upper plate is fit into said rail.

15. A rear seat apparatus for a vehicle according to claim 11, further comprising:

a frame provided inside said rear seat cushion along the peripheral edge portion thereof which projects upward when said rear seat cushion is in the upright state; and a webbing provided across said frame in the widthwise direction of the vehicle.

16. A rear seat apparatus for a vehicle according to claim 15, further comprising:

elastic members disposed between said frame and said webbing so as to prevent said webbing from slacking in its normal state.

17. A rear seat apparatus, having a rear seat cushion, disposed on a rear elevated portion of the floor of a vehicle, the floor having a stepped portion between the rear elevated portion and a portion of the floor in front of the rear elevated portion, said rear seat apparatus allowing at least the rear seat cushion to swing by approximately 90 degrees toward the front of the vehicle from a horizontal seating state to an upright state, said rear seat apparatus comprising:

a rail for guiding said rear seat cushion for movement in the longitudinal direction of the vehicle; and a hinge member composed of a lower plate, an upper plate which is fit into said rail, and a connection member for pivotably connecting one end of said lower plate and one end of said upper plate, wherein said lower plate is mounted on the elevated portion of the floor such that it is allowed to slide in the longitudinal direction of the vehicle, and said upper plate is mounted to the rear seat cushion, and said rail and said hinge member allow said rear seat cushion to be moved between the seating state, in which said rear seat cushion is disposed on the elevated portion of the floor so that a passenger can sit thereon, and the upright state, in which the rear surface of said rear seat cushion is allowed to abut a vertical wall surface of the stepped portion of the floor by swinging said rear seat cushion by approximately 90 degrees from the seating state toward the front of the vehicle and then sliding said rear seat cushion downward.

18. A rear seat apparatus for a vehicle according to claim 17, wherein said lower plate has an elongated hole for guiding said hinge member for movement in the longitudinal direction of the vehicle.

19. A rear seat apparatus for a vehicle according to claim 17, further comprising:

a frame provided inside said rear seat cushion along the peripheral-edge portion thereof which projects upward when said rear seat cushion is in the upright state; and a webbing provided across said frame in the widthwise direction of the vehicle.

20. A rear seat apparatus for a vehicle according to claim 19, further comprising:

elastic members disposed between said frame and said webbing so as to prevent said webbing from slacking in its normal state.

21. A rear seat apparatus for a vehicle according to claim 3, wherein said rear seat cushion guide portion has a stopper at a front end portion thereof relative to a vehicle longitudinal direction, and when said rear seat cushion is moved to the seating state, said stopper moves a hinge member provided at said rotary slide mechanism toward a rear end of the vehicle.

22. A rear seat apparatus for a vehicle according to claim 12, wherein said rail has a stopper at a vehicle longitudinal direction front end portion of said rail, and when said rear seat cushion is moved to the seating state, said stopper moves said hinge member toward a rear of the vehicle.

23. A rear seat apparatus for a vehicle according to claim 17, wherein said rail has a stopper at a vehicle longitudinal direction front end portion of said rail, and when said rear seat cushion is moved to the seating state, said stopper moves said hinge member toward a rear of the vehicle.

24. A rear seat apparatus for a vehicle according to claim 1 wherein, when the seat cushion is in the seating state, a front end portion of the connecting mechanism can be positioned further toward the rear of the vehicle than the vertical wall surface of the stepped portion of the floor.

25. A rear seat apparatus for a vehicle according to claim 8, wherein said elastic members are disposed between the webbing and an outer side of the frame relative to a transverse direction of the frame.

* * * * *